United States Patent [19]
Geisthoff

[11] Patent Number: 4,802,326
[45] Date of Patent: Feb. 7, 1989

[54] OVERLOAD COUPLING FOR PROTECTING DRIVE TRAINS ESPECIALLY ON AGRICULTURAL MACHINES

[75] Inventor: Hubert Geisthoff, Lohmar, Fed. Rep. of Germany

[73] Assignee: Jean Walterscheid GmbH

[21] Appl. No.: 108,732

[22] Filed: Oct. 14, 1987

[30] Foreign Application Priority Data

Oct. 16, 1986 [DE] Fed. Rep. of Germany ....... 3635163

[51] Int. Cl.⁴ .................... A01O 75/18; F16D 7/04
[52] U.S. Cl. ................................. 56/10.3; 464/37
[58] Field of Search ............. 464/37, 38; 180/14.5; 56/10.3; 192/56 R, 71

[56] References Cited

U.S. PATENT DOCUMENTS

| | | | |
|---|---|---|---|
| 2,157,574 | 5/1939 | Siesel | 464/37 |
| 2,738,847 | 3/1956 | Tomik et al. | 180/14.5 |
| 2,902,864 | 9/1959 | Digby | 464/37 |
| 2,909,047 | 10/1959 | Walterscheid-Muller et al. | 464/37 |
| 2,930,212 | 3/1960 | Walterscheid-Muller | 464/37 |
| 4,240,514 | 12/1980 | Van der Lely | 192/71 |
| 4,261,453 | 4/1981 | Kunze | 192/71 |
| 4,417,650 | 11/1983 | Geisthoff | 464/37 |
| 4,437,553 | 3/1984 | Geisthoff | 464/37 |
| 4,566,570 | 1/1986 | Geisthoff | 192/56 R |
| 4,653,623 | 3/1987 | Demorest | 464/37 |

FOREIGN PATENT DOCUMENTS

1112351 8/1961 Fed. Rep. of Germany ........ 464/37

Primary Examiner—John Weiss
Attorney, Agent, or Firm—Toren, McGeady & Associates

[57] ABSTRACT

An overload coupling for the protection of drive trains on machines, particularly agricultural machines powered by a tractor, protects against overloading in at least one rotational direction. A coupling sleeve is mounted for rotation around a coupling hub of the overload coupling. Relative rotation between the hub and sleeve is about a coupling axis. A plurality of circumferentially spaced recesses are provided in the coupling hub which each contain a rotatably mounted rotor. The rotors are mounted about their own rotor axes which are parallel to but spaced apart from the coupling axis. Each rotor contains a radially movable driver cam which is spring-loaded and has cam surfaces for engaging detent grooves in the sleeve. With the driver cams engaged in the detent grooves, relative rotation between the hub and sleeve is resisted. By shaping the cam surfaces and adjacent abutment surfaces of the driver cams, the direction and force of disengagement can be set between the coupling hub and coupling sleeve.

16 Claims, 3 Drawing Sheets

OVERLOAD COUPLING FOR PROTECTING DRIVE TRAINS ESPECIALLY ON AGRICULTURAL MACHINES

FIELD AND BACKGROUND OF THE INVENTION

The present invention relates to an overload coupling for protecting drive trains on machines, especially on tractor-drawn agricultural machines, against overload in at least one sense of rotation. The coupling includes a coupling hub, a coupling sleeve and spring-loaded driver cams acting between them.

Overload clutches with spring-loaded driving bodies which engage recesses in the other coupling half of an assembly for the transfer of torque are known (German Pat. No. 10 48 749). Such couplings operate like ratchets. They are generally of simple construction and provide great reliability of operation. A disadvantage in the known ratchet coupling is that, after an overload occurs, and the coupling rotates, a high percussive energy is produced by the spring-loaded pawls seeking to return to their engaged position. This percussive energy produces great wear, heat and mainly also a great amount of noise.

Also, couplings are known in which the driver cams provided for the transfer of torque are turned out of the torque transmitting position when an overload occurs. Such an overload coupling, as described in German Pat. No. 23 27 079, provides that engagement of the coupling in the torque transmitting position can be made only by external intervention. Furthermore, the coupling described therein is of a construction which is not suitable for use in agricultural machines because considerable complexity and expense are involved in the making and providing of the cams and of the mountings with overload protection means associated with each individual cam.

For use in farm machinery, a coupling is required which is simple in operation and requires very little outside intervention to assure its operation. Furthermore, the adjustability provided in the previously known overload coupling is considerably disadvantageous when it is used in agricultural machines. An overload coupling designed for use in farm machinery is to protect the driven equipment and, thus, is especially designed for the driven implement and, therefore, any possible tampering by an untrained person is to be prevented.

Also, in farm machinery construction, overrunning couplings are needed to see to it that the towing of the trailing implement with the drive disengaged has no negative effect on the universal shaft or on the implement drive itself.

SUMMARY OF THE INVENTION

Setting out from the above state of the art, it is the object of the present invention to create a coupling which will have a wide range of usefulness, i.e., which will be easily adaptable in manufacture to a great variety of applications since it will be possible to achieve other functions or combined functions by no more than slight modification.

Furthermore, in the case of an overload, it is to be possible to bring about a complete disengagement so as to reduce wear, yet automatic re-engagement, e.g., by lowering the rotary speed, is to take place such that any engagement shocks accompanied by another disengagement will be avoided. Moreover, the re-engagement is to take place immediately.

This object is achieved according to the invention by the fact that the driver cams are contained in rotors which are contained in pockets in one of the coupling parts and whose axes of rotation are disposed at a distance from the axis of rotation of the coupling, but parallel thereto, and the pockets are partially open toward the other coupling part to allow the driver cams to emerge.

In this arrangement, it is advantageous that the combined radial and rotary movement of the driver cam results in a rapid changeover to an overrunning position, but, on the other hand, the rotatory movement for re-engagement produces a rapid, but, at the same time, gentle, buildup of torque.

Preferably, a plurality of driver cams disposed successively along the axis of rotation of the coupling are associated with a common rotor. Also preferably, a plurality of rotors are disposed on the circumference of one of the clutch parts. By varying the number of rotors and the number of driver cams per rotor, it is possible to vary the torque capacity of the coupling.

The rotors and driver cams are associated preferably with the core of the coupling. In this manner, any negative influence that might occur - for example, due to centrifugal coupling, is avoided.

The driver cams are disposed in a blind bore in the corresponding rotor and their cam surfaces protruding from the rotors engage a matching recess in the other coupling part, namely, the outer part or barrel of the coupling.

According to the invention, provision can also be made for the rotor to have a radially disposed through-bore in which two driver cams are disposed for bias in opposite directions by a common spring. One of them, namely the abutment cam, is biased into a corresponding recess in the coupling part in which the rotor is disposed and the other driver cam is biased into the drive groove in the other coupling part.

To achieve a coupling that will act equally in both directions, provision is made for the driver cam to have cam faces and/or abutment faces symmetrically configured in a plane transverse to the axis of rotation of the coupling.

If different manners of operation are desired in each sense of rotation, such as overload coupling in one direction and overrunning in the other direction, provision is made for the driver cam to have asymmetrical cam faces and/or abutment faces. An especially desirable solution for the direction of torque transmission is achieved if the driver cam is additionally biased against the coupling part which contains the rotor.

The thrust is applied, as a rule, through the shaft of the driver cam in the area of the surfaces defining the opening in the coupling part containing the rotor. An especially good possibility for re-engagement of the coupling is achieved if the driver cam can thrust through at least one additional control surface against the area of transition between the edge of the opening and the bore containing the rotor. In the case of overload, the driver cam pivots about the center of rotation of the rotor away from its middle position and thrusts this surface against the transitional area disposed above. By means of the spring action and the configuration of the transitional area and of the thrust surface, it is possible to influence the engaging and disengaging action.

It is possible to shape the abutment surfaces such that they are formed by a prolongation of one cam surface.

The possibility of thrusting the abutment surface against the transitional area is assured by the fact that the foot of the abutment surface, when the driver cams are in the engaged state, i.e., when the cams are in the torque transmitting position, is radially slightly closer to the coupling's axis of rotation than the transitional area.

Furthermore, this is achieved also by the fact that the engagement depth of the cam surfaces snapping into the other coupling part, especially the sleeve of the coupling, measured from its apex to the transition to the abutment surface, is greater than the height of the surfaces defining the opening between the recess for the rotor and the corresponding boundary surface of the coupling part containing the rotor, namely the hub of the coupling.

In the case of overload, provision is also made so that the driver cam abuts through at least one additional abutment surface, especially the foot of the transition to the shaft of the cam, against the confronting contour of the coupling part that has the detent grooves, namely the inner contour of the coupling sleeve.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DESCRIPTION OF THE PREFERRED EMBODIMENTS

Figure 1:
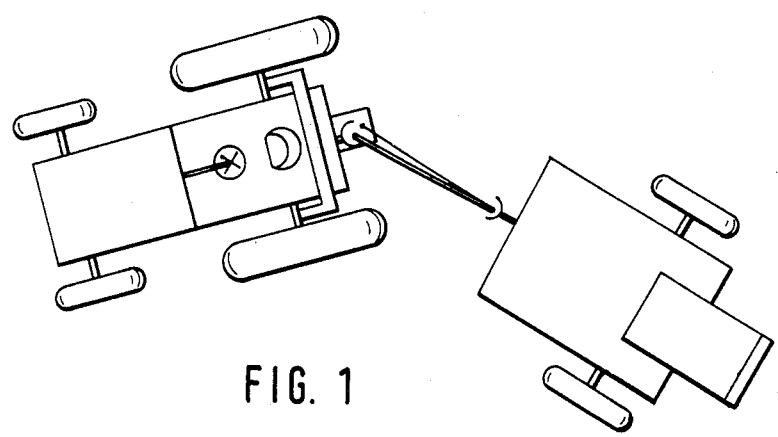
FIG. 1 is a simplified representation of a farm tractor with an implement hitched to it and powered by it.
Figure 2:
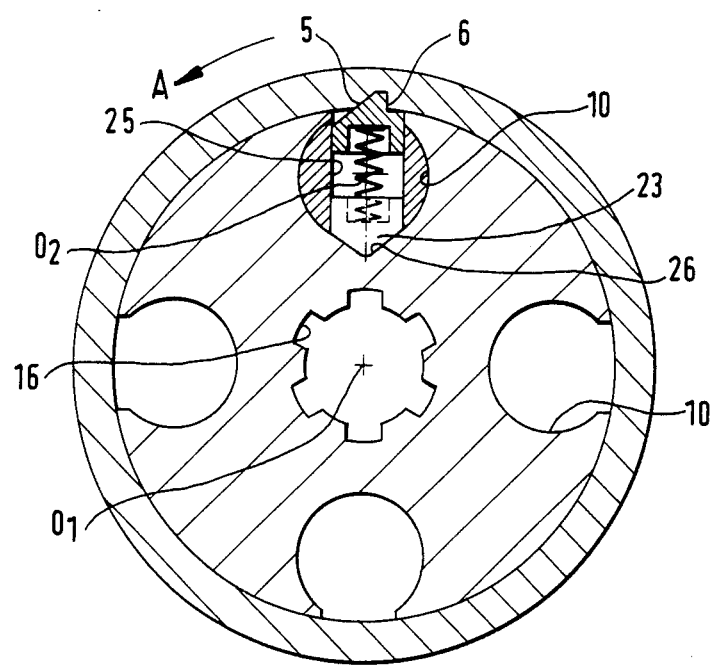
FIG. 2 is a version of the coupling in cross section, in the torque transmitting position.
Figure 3:
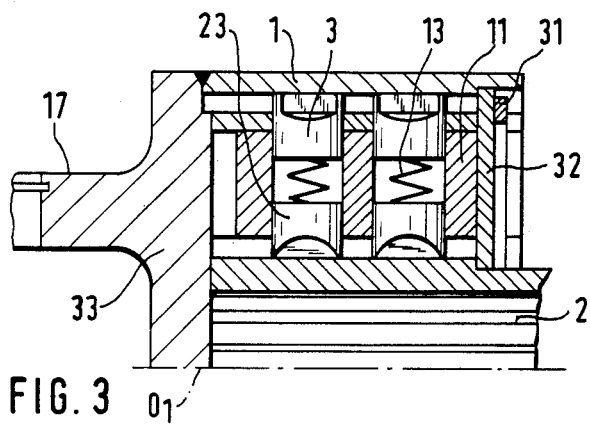
FIG. 3 is a longitudinal cross section of the coupling according to FIG. 2.
Figure 4:
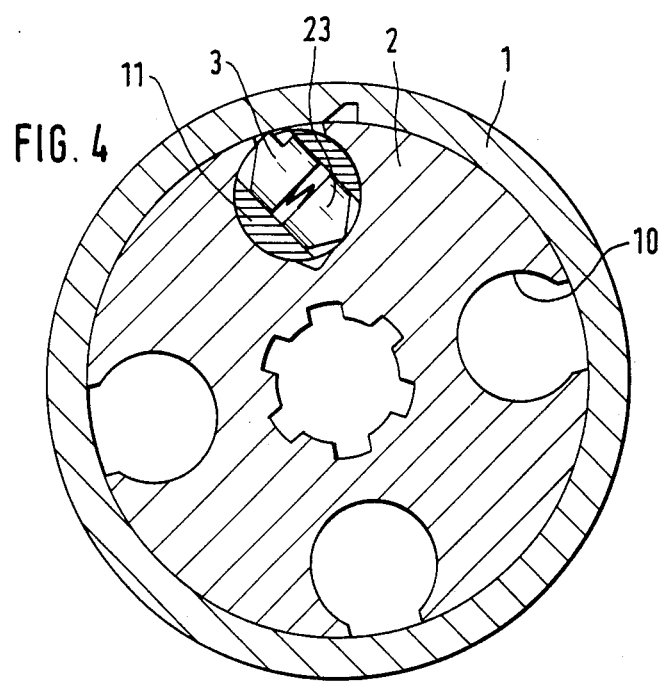
FIG. 4 is a view similar to FIG. 2 showing the coupling in the overrunning position.

The coupling according to the present invention finds its preferred application in the drive train of an agricultural power takeoff system. As shown in FIG. 1, a tractor drives a trailing implement through a universal shaft. The universal shaft is provided at its linkage to the power takeoff shaft of the tractor with a coupling according to the invention. On the other hand, however, it is also possible to arrange such couplings, for example, at certain points in the drive mechanism of the driven implement itself. As shown in FIGS. 2, 3 and 4, the coupling has a hub 2 which can be attached to the power takeoff of the tractor. The coupling hub 2 is provided with a bore 16 for this purpose.

A bore 16 has a splined configuration to cooperate with the corresponding spline shaft of the tractor for the transmission of torque.

A coupling sleeve 1 is held on the coupling hub 2 for rotatory movement thereon, but is axially undisplaceable on the hub. For example, as can be seen in FIG. 3, the hub 2 is held in one direction by a lock ring 31 and a cover plate 32. For the other direction, the coupling sleeve 1 is affixed to a flange 33, for example, by welding. The flange 33 has, for example, fork tines 17 which are only indicated in the drawing to which the cross of a universal joint is connected.

Only half of the coupling is represented in FIG. 3. It is of a configuration that is substantially symmetrical with the axis $0_1$.

Figure 5:
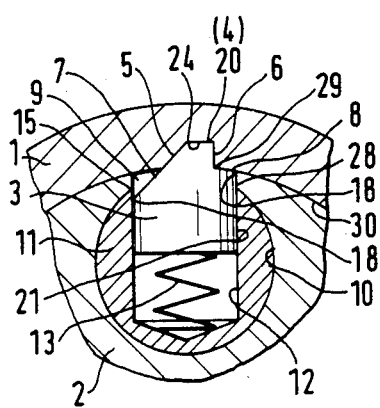
FIGS. 5 to 8 are sectional views that show various possibilities for the configuration of the coupling to suit preferred applications.

The hub 2 of the coupling has recesses 10 in the form of bores distributed over its circumference. These bores are arranged so that their axis of rotation $0_2$ are outside of the axis of rotation $0_1$ of the coupling. Rotors 11 which are of a substantially cylindrical share are rotatably mounted in the recesses 10. The rotors 11 have radially disposed blind bores 12 (FIG. 5). Driver cams 3 are inserted into the blind bores 12. Springs 13 are installed between them and the bottom of the blind bores 12. The spring 13 is engaged in the hollow shaft of the driver cams 3. At their head ends 4 the driver cams 3 are provided with cam surfaces 5 and 6 which can have a different configuration depending on the individual case. Such different configurations are represented in FIGS. 5 to 8 and are explained in conjunction therewith.

The driver cam 3 protrudes through an opening 9 in the coupling hub and is held by spring 13 with its cam surfaces 5 and 6 in contact with the detent groove 24.

FIGS. 2, 3 and 5 to 8 show the coupling in the torque transmitting position.

In the configuration of FIG. 5, the coupling hub 2 is driven by the coupling sleeve 1 in the direction of arrow A. This is a representation in which the coupling is on the implement side, i.e., the coupling hub 2 is on a stub shaft on the implement that is to be powered. If the coupling hub 2 were to be on the power takeoff of the tractor, the driver cams 3 and the detent groove 24 would be in a mirror-image relationship to FIG. 5. The cam surface 5 is less steep than cam surface 6. Furthermore, in the prolongation of cam surface 5, an abutment surface 7 is provided, while cam surface 6 adjoins an abutment surface 8 at a transition point 29. The abutment surface 8 has at its transition to the shaft surface 21 a foot 18. The abutment surface 8 abuts against the inside surface 30 of the coupling sleeve 1. The boundary surface 28 of the opening 9 is also in contact with the surface 21 of the shaft of the cam. The foot 18 of the cam surface 7 which simultaneously serves as an abutment surface lies, as seen radially, within the transition 15 between the bore 10 and the opening 9. With respect to the axis of rotation $0_1$ of the coupling, the foot 18 of surface 7 is situated closer when the cam 3 is in the engaged state than the foot 18 of surface 8 and closer than the transition 15. In the case of an overload in the sense of rotation indicated by the arrow, the cam 3 together with the rotor 11 is also rotated in the direction of the arrow, causing the cam surface 7 to come into engagement with the transition 15. At the same time, since the driver cam 3 runs against the transition 15, the driver cam is displaced radially inwardly and, as its movement continues, it is driven out of the detent groove 24.

For this purpose, the detent groove 24 is configured with clearance for the driver cam 3, especially at the transition between the head surface 4 and the surface of detent groove 24 that is adapted to the cam surface 5.

In the turning movement, a rocking movement of the foot 18 of the abutment surface 8 also takes place. Beginning at a certain position, contact of this abutment area or foot 18 with the inner surface 30 supports the inward movement of the driver cam 3 and thus brings the driver cam 3 to an approximately completely clear position. Upon further rotation, and the relative movement between the coupling hub 2 and coupling sleeve 1 that is present, the foot 18 remains in contact with the inner contour 30. Not until the rotary speed diminishes is there a return to the torque transmitting position due to the force of spring 13 and the configuration of cam surface 7 as the result of its engagement with the transition 15. This happens because a restoring moment is exerted on the rotor 11 on account of the engagement and the spring force.

Figure 6:
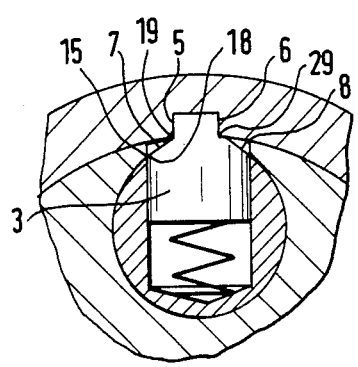

In the embodiment represents in FIG. 6, the driver cam 3 is of a symmetrical configuration in cross section. This is an embodiment in which the coupling is constructed so as to act in the same manner in both senses or directions of rotation. The torque limitation is produced through the control or force transmission which acts between the two abutment surfaces 7 and 8 provided in this example, which are less steep than the two cam surfaces 5 and 6, and the transition 15. Between the cam surfaces 5 and 6 and the abutment surfaces 7 and 8, there are transitions 19 and 29, respectively. The foot 18 of the two abutment surfaces 7 and 8 is, as already described in connection with FIG. 5, closer radially to the axis of rotation $0_1$ of the coupling than the transitions 15 between the opening 9 and the bore 10 containing the rotor 11. Here, again, clearance from the detent groove 24 is provided for the purpose of overrunning.

Figure 7:
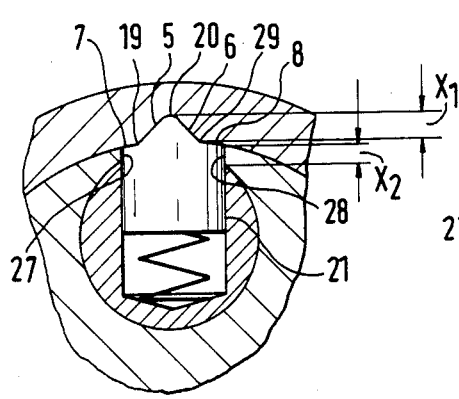

An embodiment of a coupling for a higher torque capacity is represented in FIG. 7. The driver cams 3 also have a symmetrical configuration of the cam surfaces 5 and 6 and of abutment surfaces 7 and 8. Because of the properties described below, this coupling can be used for higher torque capacities. The cam surfaces 5 and 6 have a steeper angle than the abutment surfaces 7 and 8. In addition, however, the surface 21 of the shaft of the drive cam 3 is abutted against the boundary surfaces 27 and 28 of the opening for the transmission of torque which are situated between the bore 10 and the outer circumference of the hub 2 of the coupling.

The depth of engagement of the cam surfaces 5 and 6, i.e., especially their height $X_1$ measured from the apex 20 of the two cam surfaces 5 and 6 to the transition to the two abutment surfaces 7 and 8, is greater at points 19 and 29 than the dimension $X_2$ of the boundary surfaces 27 and 28 of the opening 9.

In FIG. 7, the apex height is identified as $X_1$ and the depth of the boundary surface of the opening as $X_2$. According to the definition given above, $X_1$ is greater than $X_2$.

The result of this is a special manner of operation. In the case of overload, first an inward radial movement of the driver cam 3 is necessary before the rotor 11 can rotate. The rotatory movement of the rotor 11 in bore 10 cannot begin until the surface 21 of the shaft of the driver cam 3 becomes disengaged from the corresponding boundary surface 27 or 28 (depending on the sense of rotation) of the coupling hub 2. This is the case when the foot 18 of the abutment surfaces 7 and 8 is below the transition 15, i.e., closer radially to the coupling's axis of rotation $0_1$ than the transition 15. The driver cam 3 and with it the rotors 11 are then moved to an angular position. At this angular position, the cam surfaces 5 and 6 of the driver cam 3 come largely out of engagement with the detent grooves 24 so that, upon further relative movement between the coupling hub 2 and the coupling sleeve 1, wear will be minimized and a minimum of impact energy is produced. When the rotary speed, i.e., the relative rotary speed between the two coupling parts 1 and 2 diminishes, the force of spring 13 produces a reverse torque on the rotor 11 due to the shape of the abutment surface 7 adjacent the transition 15. This causes the driver cam 3 to be delayed in its entry with cam surfaces 5 and 6 into the detent groove 24.

Figure 8:
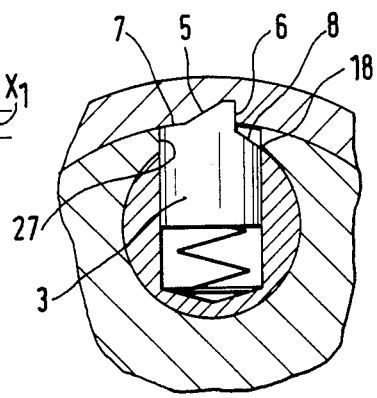

In the embodiment according to FIG. 8, the driver cam 3 has, in the driving direction, a relatively steep, i.e., nearly radially disposed cam face 6, or one parallel to the radial plane of the cam axis and a relatively low-angled cam surface 5 for the overrunning direction. The abutment surface 7 associated with the cam surface 5 is substantially matched o the inner shape 30 of the coupling sleeve 1. On the side associated with the cam surface 6, the abutment surface 8 has a steeper angle and its foot 18 is radially closer to the coupling's axis of rotation than it is to the transition 15 between the bore 10 for the rotor 11 with the through-opening 9. Because of this different configuration, different shaft lengths 21 are produced on the sides in question of the basically cylindrical driver cam 3. In the area of the abutment surface 7, the shaft surface 21 is of such dimensions that, when the torque of shaft 21 of the driver cam 3 is transmitted, it presses harder on the boundary surface 27. This is impossible with regard to the abutment surface 8. The coupling has a relatively steep characteristic in the torque transmitting direction because of the shape of the cam surface 6. The characteristic curve can be varied by varying the steepness of the cam surfaces 5 and 8.

In the opposite sense of rotation, if the drive of the tractor is stopped and the rotating masses of the driven implement continue to turn, the coupling sleeve 1 can overrun the coupling hub 2. The cam surface 5 has a correspondingly low-angled configuration. With regard to the shifting of the driver cam 3 to the overrunning position, the principle is as described in connection with FIG. 7.

The above-described embodiments and their characteristics can be combined so that different and matched cam shapes can be selected according to the application. It is also advantageous in the coupling according to the invention that this variability is also available for simplification with regard to the releasing magnitudes that are to be produced.

Lastly, still another possibility (FIGS. 2, 3 and 4) is offered by the fact that the rotor 11 is provided with a throughbore 25. Two cams can then be inserted into this throughbore 25, one of which is the driving cam 3, while the other performs an abutment function as abutment cam 23. The abutment cam 23 is held with its cam surfaces in a recess 26. The recess 26 is, in this example, contained in the coupling hub 2. Between the driver cam 3 and the abutment cam 23, there is provided a spring 13 which urges the two apart. The configuration of the driver cam 3 can be in accordance with any of the embodiments according to FIGS. 5 to 8. In the event of an overload, both cams, i.e., the driver cam 3 and the abutment cam 23 shift radially inwardly towards the axis of rotation $0_2$ of the rotor 11 and out of the engaged position in the detent groove 24 or in the recess 26. The configuration of the abutment cam 23, especially its apical height, can be selected in conjunction with the resilience characteristic of the spring 13 such that the re-engagement, i.e., the reverse movement of the rotor 11, can be controlled within wide limits.

Also, as shown in FIG. 3, a plurality of cams 3 can be mounted axially in tandem on each rotor 11.

While specific embodiments of the invention have been shown and described in detail to illustrate the application of the principles of the invention, it will be understood that the invention may be embodied otherwise without departing from such principles.

What is claimed is:

1. An overload coupling for protection against overloading of a drive train, in particular for agricultural machines, comprising a first coupling part, a second coupling part rotatably mounted to the first coupling part for relative rotation about a coupling axis, said first coupling part having a plurality of recesses therein, a rotor mounted for rotation about a rotor axis in each of said recesses, said rotor axes each being spaced from and parallel to said coupling axis, said first coupling part also having respective openings therein to said recesses for communication with said second coupling part, and a spring-loaded drive cam mounted for movement in each rotor and for engagement through said opening with said second coupling part for coupling said first and second coupling parts together.

2. An overload coupling according to claim 1, including a plurality of driver cams disposed for movement in each rotor, said driver cams in each rotor being disposed axially in tandem.

3. An overload coupling according to claim 1, wherein said recesses with rotors therein are circumferentially spaced around said first coupling part.

4. An overload coupling according to claim 1, wherein said first coupling part comprises a coupling hub, said second coupling part comprising a coupling sleeve mounted for relative rotation to said coupling hub about said coupling axis.

5. An overload coupling according to claim 1, wherein each rotor contains a blind bore, said driver cam for each rotor being mounted for radial movement in the blind bore of its rotor, said second coupling part carrying a plurality of detent grooves, said driver cams having cam surfaces projecting out of said blind bores and engageable with said detent grooves, said detent grooves corresponding at least partly in shape with said cam surfaces.

6. An overload coupling according to claim 1, wherein said second coupling part includes at least one detent groove for receiving a driver cam, each rotor including a radially extending bore therethrough, said driver cam riding radially in said bore, an abutment cam riding in each bore, a common spring engaged between said driver and abutment cams in each bore for biasing said driver and abutment cams apart in each rotor, each recess of said first coupling part including an abutment portion for engagement with said abutment cam when said driver cam is engaged in said detent groove.

7. An overload coupling according to claim 1, wherein said second coupling part includes a detent groove, said driver cams each including cam surfaces for engagement in said detent groove for resisting relative rotation between said first and second coupling parts in both rotational directions.

8. An overload coupling according to claim 7, wherein said cam surfaces have a symmetrical configuration taken along a cross-sectional plane passing through said coupling axis.

9. An overload coupling according to claim 7, wherein said cam surfaces have a configuration which is asymmetrical on a cross-sectional plane passing through said coupling axis.

10. An overload coupling according to claim 1, wherein said driver cam extends beyond said rotor so as to engage a portion of said first coupling part with rotation of said rotor to aid in disengaging said driver cam from said second coupling part to permit relative rotation between said first and second coupling parts.

11. An overload coupling according to claim 10, wherein each rotor has an axial opening therein for receiving a driver cam, each driver cam having a shaft surface riding in said rotor, said shaft surface also riding against said opening of said recess for said rotor.

12. An overload coupling according to claim 7, wherein each driver cam includes at least one abutment surface adjacent one of said cam surface, said abutment surface being positioned adjacent to a transition positioned adjacent a transition edge lying between said recess for a rotor carrying said driver cam and the opening to said recess, said driver cam having a shaft surface riding in said rotor.

13. An overload coupling according to claim 12, wherein said abutment surface comprises a prolongation of said cam surface.

14. An overload coupling according to claim 12, wherein each driver cam has a shaft surface for riding in a rotor, each abutment surface having a foot at the junction between said abutment surface and said shaft surface, said foot being closer to said coupling axis than said transition edge.

15. An overload coupling according to claim 12, wherein each rotor has a bore communicating with said opening in one rotational position of said bore in said recess, said driver cams each having said shaft surface riding said rotor bore and said opening, said cam surfaces having an apex and a depth between said apex and said abutment surface, each cam surface having an abutment surface adjacent thereto, each abutment surface having a foot at a transition between said abutment surface and said shaft surface, said shaft surface having a boundary surface between said recess for containing said rotor and said foot, the depth of said cam surfaces being greater than the depth of said boundary surface.

16. An overload coupling according to claim 12, wherein said abutment surface lies against a surface of said second coupling part which is adjacent to said detent groove when said cam surfaces are in said detent groove.

* * * * *